(12) United States Patent
Gong (10) Patent No.: US 12,446,129 B2
(45) Date of Patent: Oct. 14, 2025

(54) FILTER CIRCUIT, DIMMING SYSTEM, AND ELECTRONIC APPARATUS

(71) Applicants: SHENZHEN SUNRICHER TECHNOLOGY CO., LTD., Shenzhen (CN); ELEMENTAL LED INC, Reno, NV (US)

(72) Inventor: Fei Gong, Guangdong (CN)

(73) Assignees: SHENZHEN SUNRICHER TECHNOLOGY CO., LTD., Shenzhen (CN); ELEMENTAL LED INC, Reno, NV (US)

( * ) Notice: Subject to any disclaimer, the term of this patent is extended or adjusted under 35 U.S.C. 154(b) by 41 days.

(21) Appl. No.: 18/664,456

(22) Filed: May 15, 2024

(65) Prior Publication Data

US 2025/0031290 A1 Jan. 23, 2025

(30) Foreign Application Priority Data

Jul. 21, 2023 (CN) .......................... 202310916156.3

(51) Int. Cl.
| | | |
|---|---|---|
| H05B 45/34 | (2020.01) | |
| H05B 45/10 | (2020.01) | |
| H05B 45/38 | (2020.01) | |

(52) U.S. Cl.
CPC .............. *H05B 45/34* (2020.01); *H05B 45/10* (2020.01); *H05B 45/38* (2020.01)

(58) Field of Classification Search
CPC ......... H05B 45/34; H05B 45/38; H05B 45/10
See application file for complete search history.

(56) References Cited

U.S. PATENT DOCUMENTS

| | | | | |
|---|---|---|---|---|
| 7,339,804 B2 * | 3/2008 | Uchida | ................... | H02M 1/32 |
| | | | | 363/21.16 |
| 9,160,228 B1 * | 10/2015 | Parker | ................... | H02M 3/158 |
| (Continued) | | | | |

FOREIGN PATENT DOCUMENTS

| | | | | |
|---|---|---|---|---|
| CN | 1643768 | A | * 7/2005 | ............ H02M 7/219 |
| CN | 101873073 | A | * 10/2010 | |
| (Continued) | | | | |

*Primary Examiner* — Adam D Houston
(74) *Attorney, Agent, or Firm* — Nicholas Martin; Greenberg Traurig, LLP (57) ABSTRACT

A filter circuit including a first common mode suppression module, a first differential mode suppression module, a first differential mode capacitor module, a second differential mode suppression module, a second common mode suppression module, a second differential mode capacitor module, a rectifier module, and a π-shaped filter module; the first differential mode suppression module is electrically connected with the first common mode suppression module and the second differential mode suppression module, the second common mode suppression module is electrically connected with the second differential mode suppression module and the rectifier module, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module.

20 Claims, 5 Drawing Sheets

(56) References Cited

U.S. PATENT DOCUMENTS

| | | | | |
|---|---|---|---|---|
| 10,277,109 | B2* | 4/2019 | Borgogni | H02M 1/126 |
| 2008/0080106 | A1* | 4/2008 | Mirafzal | H02M 1/12 |
| | | | | 361/42 |
| 2011/0044077 | A1* | 2/2011 | Nielsen | H02M 7/217 |
| | | | | 363/127 |
| 2016/0079888 | A1* | 3/2016 | Li | H01F 17/04 |
| | | | | 318/400.3 |
| 2017/0302166 | A1* | 10/2017 | Chen | H02M 3/158 |
| 2025/0031290 | A1* | 1/2025 | Gong | H05B 45/10 |
| 2025/0070672 | A1* | 2/2025 | Xia | H02M 3/158 |
| 2025/0070673 | A1* | 2/2025 | Xia | H02M 1/0038 |

FOREIGN PATENT DOCUMENTS

| | | | | |
|---|---|---|---|---|
| CN | 201657462 | U | * 11/2010 | |
| CN | 209930571 | U | * 1/2020 | |
| CN | 117015104 | A | * 11/2023 | H05B 45/34 |
| JP | H08266057 | A | * 10/1996 | |
| JP | 2006351353 | A | * 12/2006 | |
| JP | 2014239629 | A | * 12/2014 | |
| JP | 2022077943 | A | * 5/2022 | |
| JP | 2023147020 | A | * 10/2023 | |

* cited by examiner

FILTER CIRCUIT, DIMMING SYSTEM, AND ELECTRONIC APPARATUS

CROSS REFERENCE TO RELATED APPLICATION

The present application claims priority of a Chinese patent application, with application No. 202310916156.3, filed on Jul. 21, 2023; the contents of which are incorporated in the present application by reference.

TECHNICAL FIELD

The present application relates to the technical field of electronic circuits, and more particularly to a filter circuit, a dimming system, and an electronic apparatus.

BACKGROUND

For the lighting field, due to the advantages of small size, reasonable price, and wide dimming power range, the thyristor phase controlled dimming method (chopping method) is currently the most widely used dimming method, and is widely used in stage lighting and environmental lighting. However, there are currently some defects in the 120V high-power thyristor dimming system: when the dimming effect is good, the conduction will exceed the standard; when the conduction does not exceed the standard, the dimming effect is poor, and it is impossible to ensure that the conduction does not exceed the standard when achieving good dimming effect.

SUMMARY

Embodiments of the present application provide a filter circuit, a dimming system, and an electronic apparatus, which can solve the problem that the 120V high-power thyristor dimming system cannot ensure that the conduction does not exceed the standard when achieving good dimming effect.

In a first aspect, an embodiment of the present application provides a filter circuit, which includes a first common mode suppression module, a first differential mode suppression module, a first differential mode capacitor module, a second differential mode suppression module, a second common mode suppression module, a second differential mode capacitor module, a rectifier module, and a π-shaped filter module;

the first differential mode suppression module is electrically connected with the first common mode suppression module and the second differential mode suppression module, the second common mode suppression module is electrically connected with the second differential mode suppression module and the rectifier module, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module, the first common mode suppression module is configured for electrically connecting with an alternating current power supply through a thyristor dimmer, and the π-shaped filter module is configured for electrically connecting with a booster circuit;

the first common mode suppression module and the second common mode suppression module are configured for suppressing a common mode interference signal in an alternating current voltage signal provided by the alternating current power supply; the first differential mode suppression module, the second differential mode suppression module, the first differential mode capacitor module, and the second differential mode capacitor module are configured for suppressing a differential mode interference signal in the alternating current voltage signal; the rectifier module is configured for rectifying the alternating current voltage signal into a direct current voltage signal; the π-shaped filter module is configured for filtering the direct current voltage signal and transmitting a filtered direct current voltage signal to the booster circuit; and a sum of a capacitance capacity of the first differential mode capacitor module and the second differential mode capacitor module is less than or equal to a preset value, and a sum of a capacitance capacity of the π-shaped filter module is greater than the sum of the capacitance capacity of the first differential mode capacitor module and the second differential mode capacitor module.

In a possible implementation manner in the first aspect, the sum of the capacitance capacity of the π-shaped filter module is 2 to 3 times of the sum of the capacitance capacity of the first differential mode capacitor module and the second differential mode capacitor module.

In a possible implementation manner in the first aspect, the first common mode suppression module includes a first common mode choke; a first input terminal of the first common mode choke is configured for electrically connecting with a live line of the alternating current power supply through the thyristor dimmer; and a second input terminal of the first common mode choke is configured for electrically connecting with a neutral line of the alternating current power supply; and the first output terminal and the second output terminal of the first common mode choke are electrically connected with the first differential mode suppression module.

In a possible implementation manner in the first aspect, the first differential mode suppression module includes a first differential mode choke, a first resistor, a third differential mode choke, and a third resistor; a first terminal of the first differential mode choke is electrically connected with a first terminal of the first resistor and the first common mode suppression module, respectively; a second terminal of the first differential mode choke is electrically connected with a second terminal of the first resistor, the first differential mode capacitor module, and the second differential mode suppression module, respectively; a first terminal of the third differential mode choke is electrically connected with a first terminal of the third resistor and the first common mode suppression module, respectively; and a second terminal of the third differential mode choke is electrically connected with a second terminal of the third resistor, the first differential mode capacitor module, and the second differential mode suppression module, respectively; and an inductance amount of the first differential mode choke is equal to that of the third differential mode choke.

In a possible implementation manner in the first aspect, the second differential mode suppression module includes a second differential mode choke, a fourth differential mode choke, a second resistor, and a fourth resistor; a first terminal of the second differential mode choke is electrically connected with a first terminal of the second resistor, the first differential mode capacitor module, and the first differential mode suppression module, respectively; a second terminal of the second differential mode choke is electrically connected with a second terminal of the second resistor, and the second common mode suppression module, respectively; a first terminal of the fourth differential mode choke is electrically connected with a first terminal of the fourth resistor, the first differential mode capacitor module, and the first differential mode suppression module, respectively; and a second terminal of the fourth differential mode choke is electrically connected with a second terminal of the fourth resistor, and the second common mode suppression module respectively; and an inductance amount of the second differential mode choke is equal to that of the fourth differential mode choke.

In a possible implementation manner in the first aspect, the second common mode suppression module includes a first common mode capacitor, a second common mode capacitor, a third common mode capacitor, and a second common mode choke; a first terminal of the first common mode capacitor is electrically connected with a first input terminal of the second common mode choke and the second differential mode suppression module, respectively; a second terminal of the first common mode capacitor is electrically connected with a first terminal of the second common mode capacitor, a first terminal of the third common mode capacitor, and a ground line of the alternating current power supply, respectively, and the ground line of the alternating current power supply is connected to a ground; a second terminal of the second common mode capacitor is electrically connected with a second input terminal of the second common mode choke and the second differential mode suppression module, respectively; a first output terminal of the second common mode choke is electrically connected with the second differential mode capacitor module and the rectifier module, respectively; a second output terminal of the second common mode choke is electrically connected with the second differential mode capacitor module and the rectifier module, respectively; and a second terminal of the third common mode capacitor is electrically connected with a digital ground.

In a possible implementation manner in the first aspect, the first differential mode capacitor module includes a first differential mode capacitor connected between the first differential mode suppression module and the second differential mode suppression module.

In a possible implementation manner in the first aspect, the second differential mode capacitor module includes a second differential mode capacitor connected between the second common mode suppression module and the rectifier module, and capacitors in the first differential mode capacitor, the second differential mode capacitor, and the π-shaped filter module are made of polypropylene film.

In a second aspect, an embodiment of the present application provides a dimming system, which includes: a thyristor dimmer, a booster circuit, a DC-DC circuit, a signal detection circuit, a photocoupler, a dimming circuit, a first switching tube and the filter circuit according to any items of the first aspect; the first common mode suppression module in the filter circuit is electrically connected with a live line of an alternating current power supply through a thyristor regulator; the first common mode suppression module in the filter circuit is further configured for electrically connecting with a neutral line of the alternating current power supply; the π-shaped filter module in the filter circuit is electrically connected with a boost circuit; two terminals of the second differential mode capacitor module in the filter circuit are electrically connected with a signal detection circuit; the DC-DC circuit is respectively electrically connected with the boost circuit, the dimming circuit and a positive electrode of a light-emitting device; the signal detection circuit is electrically connected with an input terminal of the photocoupler, and an output terminal of the photocoupler is electrically connected with the dimming circuit; the dimming circuit is electrically connected with a control terminal of the first switching tube; and a first conduction terminal of the first switching tube is electrically connected with a negative electrode of the light-emitting device, and a second conduction terminal of the first switching tube is electrically connected with an analog ground.

In a third aspect, an embodiment of the present application provides an electronic apparatus, which includes the dimming system according to the second aspect.

The beneficial effects of the embodiment of the present application when compared to the prior art are:

The embodiment of the present application provides a filter circuit, and the filter circuit includes the first common mode suppression module, the first differential mode suppression module, the first differential mode capacitor module, the second differential mode suppression module, the second common mode suppression module, the second differential mode capacitor module, the rectifier module, and the π-shaped filter module. The first differential mode suppression module is electrically connected with the first common mode suppression module and the second differential mode suppression module, the second common mode suppression module is electrically connected with the second differential mode suppression module and the rectifier module, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module, the first common mode suppression module is configured for electrically connecting with an alternating current power supply through a thyristor dimmer, and the π-shaped filter module is configured for electrically connecting with a booster circuit.

The first common mode suppression module and the second common mode suppression module are configured for suppressing a common mode interference signal in an alternating current voltage signal provided by the alternating current power supply. The first differential mode suppression module, the second differential mode suppression module, the first differential mode capacitor module, and the second differential mode capacitor module are configured for suppressing a differential mode interference signal in the alternating current voltage signal. The rectifier module is configured for rectifying the alternating current voltage signal into a direct current voltage signal. The π-shaped filter module is configured for filtering the direct current voltage signal and transmitting a filtered direct current voltage signal to the booster circuit. In which, a sum of a capacitance capacity of the first differential mode capacitor module and the second differential mode capacitor module is less than or equal to a preset value, and a sum of a capacitance capacity of the π-shaped filter module is greater than the sum of the capacitance capacity of the first differential mode capacitor module and the second differential mode capacitor module.

Based on the above circuit structure, the present application performs parameter matching on the capacitance capacity of the first differential mode capacitor module, the second differential mode capacitor module and the π-shaped filter module; the capacitance capacity of the first differential mode capacitor module and the second differential mode capacitor module affects the dimming effect. The smaller the sum of the capacitance capacity of the first differential mode capacitor module and the second differential mode capacitor module, the better the dimming effect will be, while the conduction will exceed the standard, when the conduction does not exceed the standard, the dimming effect will be poor, so that in order to achieve a balance between the dimming effect and the conduction, the present application reduces the sum of the capacitance capacity of the first differential mode capacitor module and the second differential mode capacitor module while improving the sum of the capacitance capacity of the π-shaped filter module. Thus, when the sum of the capacitance capacity of the first differential mode capacitor module and the second differential mode capacitor module is less than or equal to a preset value, and the sum of the capacitance capacity of the π-shaped filter module is greater than the sum of the capacitance capacity of the first differential mode capacitor module and the second differential mode capacitor module, the 120V high-power thyristor dimming system can not only achieve good dimming effect, but also ensure that the transmission does not exceed the standard.

In summary, the filter circuit provided in the embodiment of the present application solves the problem that the 120V high-power thyristor dimming system cannot ensure that the conduction does not exceed the standard when achieving good dimming effect.

It is understandable that the beneficial effects of the above second aspect to the third aspect can be referred to the relevant description in the above first aspect, which will not be repeated herein.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

In the drawings, the reference signs are listed:
  10—filter circuit; 11—first common mode suppression module; 12—first differential mode suppression module; 13—first differential mode capacitor module; 14—second differential mode suppression module; 15—second common mode suppression module; 16—second differential mode capacitor module; 17—rectifier module; 18—π-shaped filter module; 20—thyristor dimmer; 30—booster circuit; 40—DC-DC (Direct current-direct Current, DC-DC) circuit; 50—signal detection circuit; 60—photocoupler; 70—dimming circuit; 80—AC power supply.

DETAILED DESCRIPTION OF EMBODIMENTS

In the following description, specific details such as specific system structure, technology, etc. are presented for illustration rather than qualification in order to fully understand the embodiments of the present application. However, it should be clear to those skilled in the art that the present application may also be realized in other embodiments without these specific details. In other cases, detailed descriptions of well-known systems, devices, circuits and methods are omitted so as not to prejudice the description of the present application with unnecessary details.

It is to be understood that when used in the present application description and the accompanying claims, the term "includes" indicates the existence of the features, wholes, steps, operations, elements and/or components described, but does not exclude the existence or addition of one or more other features, wholes, steps, operations, elements, components and/or collections thereof.

It should also be understood that the term "and/or" as used in the description of the present application and the accompanying claims means any combination of one or more of the items listed in relation to them and all possible combinations thereof, and includes such combinations.

As used in the description of the present application and the accompanying claims, the term "if" may be construed in the context to mean "when . . . " or "once" or "in response to determination" or "in response to detection". Similarly, the phrase "if determined" or "if the described condition or event is detected" can be interpreted, depending on the context, to mean "once determined" or "in response to determined" or "once the described condition or event is detected" or "in response to detected the described condition or event".

In addition, the terms "first", "second", "third", etc. in the description of the present application and the accompanying claims are used only to distinguish the description and are not to be construed as indicating or implying relative importance.

References to "one embodiment" or "some embodiments", etc. as described in the description of the present application means that specific features, structures, or features described in conjunction with the embodiments are included in one or more embodiments of the present application. Thus, the terms "in one embodiment", "in some embodiments", "in some other embodiments", "in some further embodiments", etc., which appear in differences in the specification, do not necessarily all refer to the same embodiments, but mean "one or more but not all embodiments" unless otherwise specifically emphasized. The terms "including", "containing", "having" and their variations all mean "including but not limited to" unless otherwise specifically emphasized.

At present, for the 120V high-power thyristor dimming system, when the dimming effect is good, it cannot pass the conduction test in the FCC part 15 standard (that is, an electromagnetic compatibility standard formulated by the Federal Communications Commission FCC), if it wants to pass the conduction test, it is necessary to sacrifice the dimming effect.

Figure 1:
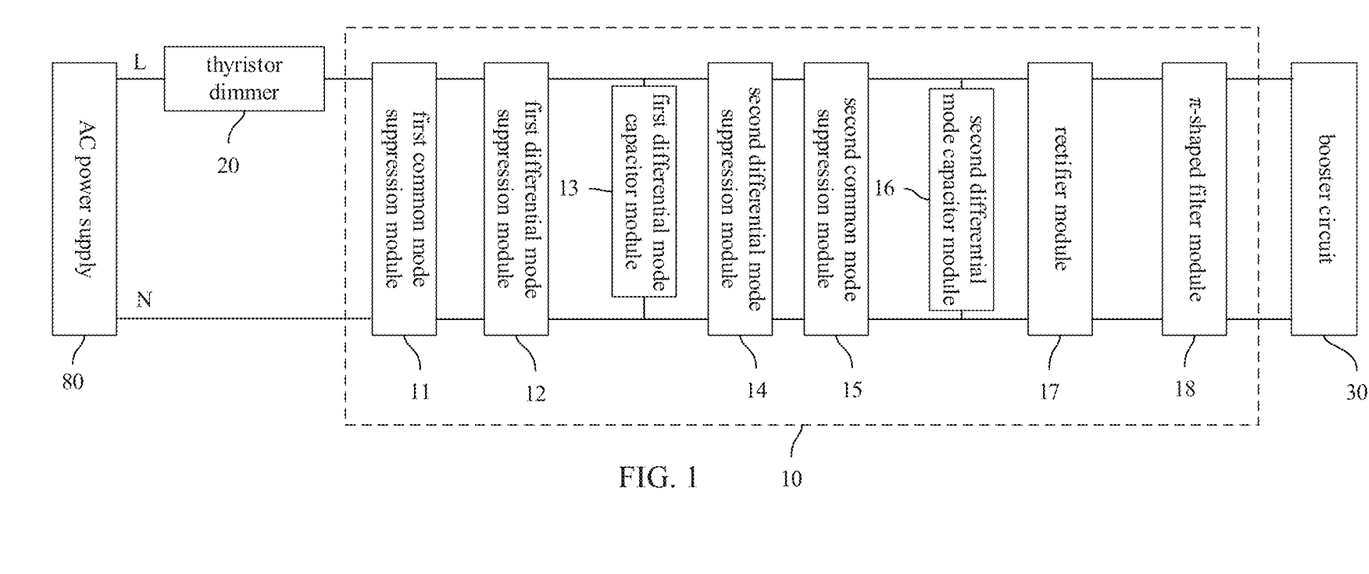
FIG. 1 is a block diagram of a filter circuit provided by an embodiment of the present application.

Regarding to the above problems, the embodiment of the present application provides a filter circuit, as shown in FIG. 1, the filter circuit 10 includes: the first common mode suppression module 11, the first differential mode suppression module 12, the first differential mode capacitor module 13, the second differential mode suppression module 14, the second common mode suppression module 15, the second differential mode capacitor module 16, the rectifier module 17, and the π-shaped filter module 18. The first differential mode suppression module 12 is electrically connected with the first common mode suppression module 11 and the second differential mode suppression module 14, respectively. The second common mode suppression module 15 is electrically connected with the second differential mode suppression module 14 and the rectifier module 17, respectively. The rectifier module 17 is electrically connected with the π-shaped filter module 18. The first differential mode capacitor module 13 is connected between the first differential mode suppression module 12 and the second differential mode suppression module 14, the second differential mode capacitor module 16 is connected between the second common mode suppression module 15 and the rectifier module 17, and the first common mode suppression module 11 is used for electrically connecting with the AC power supply 80 through the thyristor dimmer 20. The π-shaped filter module 18 is used for electrically connecting with the booster circuit 30. The AC power supply 80 provides 120V and 60 Hz AC voltage signals, and the boost circuit 30 is the boost circuit in the thyristor dimming system.

Specifically, after the AC voltage signal provided by the AC power supply 80 is chopped through the thyristor dimmer 20, the electrical signal is output to the filter circuit 10. The filter circuit 10 is used to filter the electrical signal output by the thyristor dimmer 20, especially to suppress the common mode interference signal and the differential mode interference signal, so as to provide a stable and clean DC voltage signal for the subsequent booster circuit 30.

The first common mode suppression module 11, the first differential mode suppression module 12, the first differential mode capacitor module 13, the second differential mode suppression module 14, the second common mode suppression module 15, and the second differential mode capacitor module 16 constitute an EMI (Electro Magnetic Interference) filter. The first common mode suppression module 11 and the second common mode suppression module 15 are used to suppress the common mode interference signal in the AC voltage signal provided by the AC power supply 80, the first differential mode suppression module 12, the second differential mode suppression module 14, the first differential mode capacitor module 13 and the second differential mode capacitor module 16 are used to suppress the differential mode interference signal in the AC voltage signal. The first differential mode suppression module 12 and the second differential mode suppression module 14 provide a better balance effect. The rectifier module 17 is used to rectify the AC voltage signal to the DC voltage signal. The π-shaped filter module 18 is used to filter the DC voltage signal and provide a stable and clean DC voltage signal for the subsequent booster circuit 30.

Based on the above circuit structure of the present application, parameter matching is performed on the capacitor capacity of the first differential mode capacitor module 13, the second differential mode capacitor module 16 and the π-shaped filter module 18. The capacitor capacity of the first differential mode capacitor module 13 and the second differential mode capacitor module 16 affect the dimming effect, when the sum of the capacitor capacity of the first differential mode capacitor module 13 and the second differential mode capacitor module 16 is smaller, the dimming effect is better, but the conduction will exceed the standard, when the conduction is not exceeded, the dimming effect will be poor, so in order to achieve a balance between the dimming effect and conduction, the present application reduces the sum of the capacitor capacity of the first differential module capacitor module 13 and the second differential mode capacitor module 16 and improves the sum of the capacitor capacity of the π-shaped filter module 18. Therefore, when the sum of the capacitance capacity of the first differential mode capacitor module 13 and the second differential mode capacitor module 16 is less than or equal to the preset value, and when the sum of the capacitance capacity of the π-shaped filter module 18 is greater than the sum of the capacitance capacity of the first differential mode capacitor module 13 and the second differential mode capacitor module 16, the 120V high-power thyristor dimming system can not only achieve good dimming effect, but also pass the conduction test in the FCC part 15 standard. In the embodiment, the preset value is 0.104 uF.

In summary, the filter circuit 10 provided in the present application example solves the problem that the 120V high-power thyristor dimming system cannot ensure that the conduction does not exceed the standard when achieving good dimming effect.

The filter circuit 10 provided in the present application embodiment achieves a balance between the dimming effect and conduction of the 120V high-power thyristor dimming system by matching the internal parameters, so that it can be compatible with more thyristor dimmers 20 (such as a front-cut phase type and a rear-cut phase type thyristor dimmer 20, etc.) and has stronger adaptability. Through the test, the 120V high-power thyristor dimming system adopts the filter circuit 10 provided by the embodiment of the present application, which can be compatible with 3-5 kinds of thyristor dimmer 20.

It should be noted that the sum of the capacitance capacity of the π-shaped filter module 18 is 2 to 3 times of the sum of the capacitance capacity of the first differential mode capacitor module 13 and the second differential mode capacitor module 16.

Figure 2:
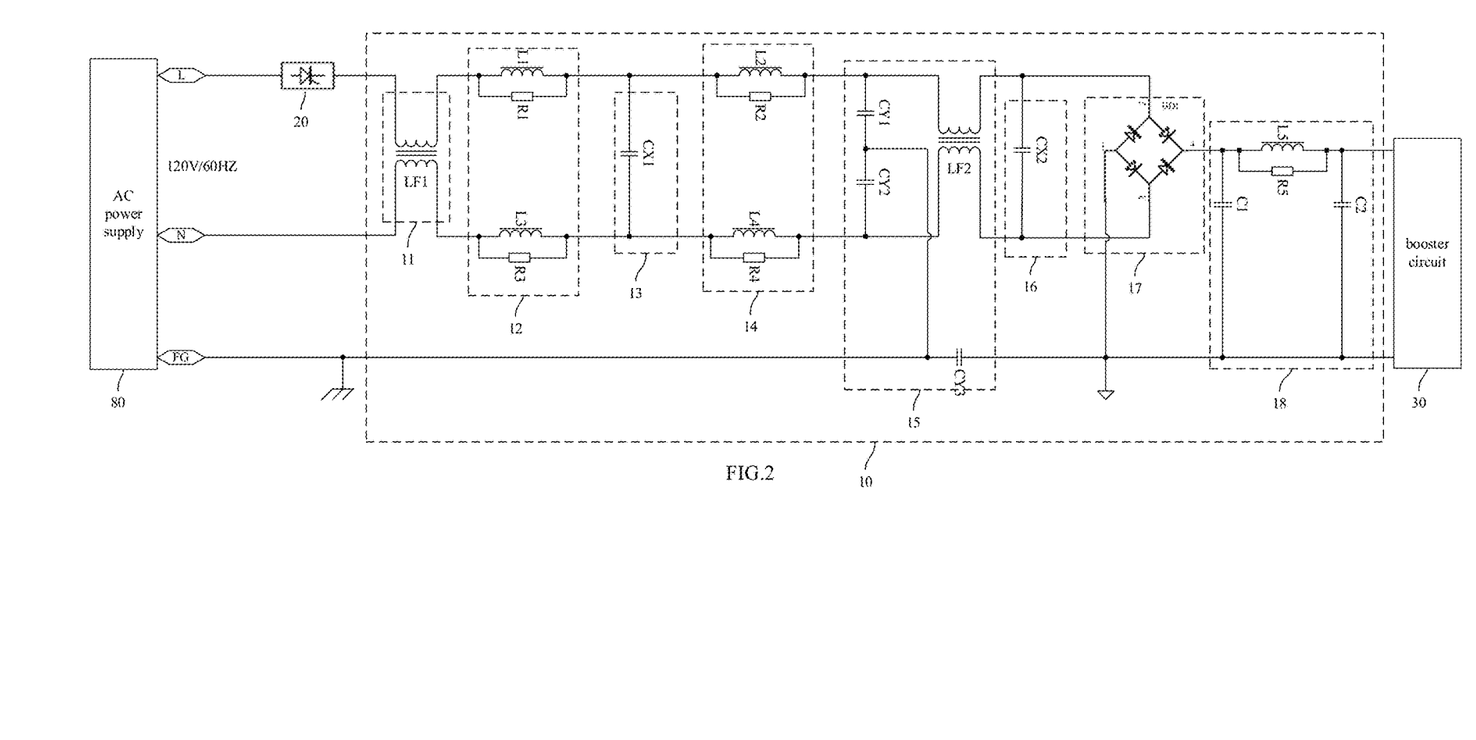
FIG. 2 is a circuit connection diagram of a filter circuit provided by an embodiment of the present application.

As shown in FIG. 2, the first common mode suppression module 11 includes a first common mode choke LF1, a first input terminal of the first common mode choke LF1 is used for electrically connecting with a live line L of the AC power supply 80 through the thyristor dimmer 20, and a second input terminal of the first common mode choke LF1 is used for electrically connecting with a neutral line N of the AC power supply 80. The first output terminal and second output terminal of the first common mode choke LF1 are electrically connected to the first differential mode suppression module 12. Specifically, the first common mode choke LF1 is used to suppress common mode interference signals.

It should be noted that the first common mode suppression module 11 can also be replaced by other modules that can achieve its function, which is not limited herein.

As shown in FIG. 2, the first differential mode suppression module 12 includes a first differential mode choke L1, a first resistor R1, a third differential mode choke L3, and a third resistor R3. The first terminal of the first differential mode choke L1 is electrically connected to the first terminal of the first resistor R1 and the first common mode suppression module 11, respectively, and the second terminal of the first differential mode choke L1 is electrically connected to the second terminal of the first resistor R1, the first differential mode capacitor module 13, and the second differential mode suppression module 14, respectively. The first terminal of the third differential mode choke L3 is electrically connected to the first terminal of the third resistor R3 and the first common mode suppression module 11, respectively, and the second terminal of the third differential mode choke L3 is electrically connected to the second terminal of the third resistor R3, the first differential mode capacitor module 13, and the second differential mode suppression module 14, respectively. As shown in FIG. 2, the first terminal of the first differential mode choke L1 is electrically connected to the first terminal of the first resistor R1 and the first output terminal of the first common mode choke LF1, respectively, and the first terminal of the third differential mode choke L3 is electrically connected to the first terminal of the third resistor R3 and the second output terminal of the first common mode choke LF1, respectively. The inductance of the first differential mode choke L1 is equal to that of the third differential mode choke L3 and the inductance need not be too high.

Specifically, the first differential mode choke L1 and the third differential mode choke L3 are used to suppress differential mode interference signals. The first resistor R1 and the third resistor R3 are discharge resistors to avoid excessive peak voltage of the first differential mode choke L1 and the third differential mode choke L3.

It should be noted that the first differential mode suppression module 12 can also be replaced by other modules that can achieve its function, which is not limited herein.

As shown in FIG. 2, the second differential mode suppression module 14 includes the second differential mode choke L2, the fourth differential mode choke L4, the second resistor R2, and the fourth resistor R4. The first terminal of the second differential mode choke L2 is electrically connected to the first terminal of the second resistor R2, the first differential mode capacitor module 13 and the first differential mode suppression module 12, respectively, and the second terminal of the second differential mode choke L2 is electrically connected to the second terminal of the second resistor R2 and the second common mode suppression module 15, respectively. The first terminal of the fourth differential mode choke L4 is electrically connected to the first terminal of the fourth resistor R4, the first differential mode capacitor module 13 and the first differential mode suppression module 12, respectively, and the second terminal of the fourth differential mode choke L4 is electrically connected to the second terminal of the fourth resistor R4 and the second common mode suppression module 15, respectively. As shown in FIG. 2, the first terminal of the second differential mode choke L2 is electrically connected to the first terminal of the second resistor R2, the first differential mode capacitor module 13, the second terminal of the first differential mode choke L1, and the second terminal of the first resistor R1, respectively. The first terminal of the fourth differential mode choke L4 is electrically connected to the first terminal of the fourth resistor R4, the first differential mode capacitor module 13, the second terminal of the third differential mode choke L3, and the second terminal of the third resistor R3, respectively. The inductance of the second differential mode choke L2 is equal to that of the fourth differential mode choke L4 and the inductance need not be too high.

Specifically, the second differential mode choke L2 and the fourth differential mode choke L4 are used to suppress differential mode interference signals. The second resistor R2 and the fourth resistor R4 are discharge resistors to avoid the high peak voltage of the second differential mode choke L2 and the fourth differential mode choke L4. It should be pointed out that the use of four differential mode chokes L1-L4 can play a better balance effect.

It should be noted that the second differential mode suppression module 14 can also be replaced by other modules that can achieve its function, which is not limited herein.

As shown in FIG. 2, the second common mode suppression module 15 includes the first common mode capacitor CY1, the second common mode capacitor CY2, the third common mode capacitor CY3 and the second common mode choke LF2. The first terminal of the first common mode capacitor CY1 is electrically connected with the first input terminal of the second common mode choke LF2 and the second differential mode suppression module 14, respectively, and the second terminal of the first common mode capacitor CY1 is electrically connected with the first terminal of the second common mode capacitor CY2, the first terminal of the third common mode capacitor CY3 and the ground line FG of the AC power supply 80, respectively. The ground line FG of the AC power supply 80 is connected to the ground, the second terminal of the second common mode capacitor CY2 is electrically connected to the second input terminal of the second common mode choke LF2 and the second differential mode suppression module 14, respectively, and the first output terminal of the second common mode choke LF2 is electrically connected to the second differential mode capacitor module 16 and the rectifier module 17, respectively. The second output terminal of the second common mode choke LF2 is electrically connected to the second differential mode capacitor module 16 and the rectifier module 17 respectively, and the second terminal of the third common mode capacitor CY3 is electrically connected to the digital ground. As shown in FIG. 2, the first terminal of the first common mode capacitor CY1 is electrically connected to the first input terminal of the second common mode choke LF2, the second terminal of the second differential mode choke L2, and the second terminal of the second resistor R2, respectively. The second terminal of the second common mode capacitor CY2 is electrically connected to the second input terminal of the second common mode choke LF2, the second terminal of the fourth differential mode choke L4, and the second terminal of the fourth resistor R4, respectively. Specifically, the first common mode capacitor CY1, the second common mode capacitor CY2, the third common mode capacitor CY3, and the second common mode choke LF2 are used to suppress common mode interference signals.

It should be noted that the second common mode suppression module 15 can also be replaced by other modules that can achieve its function, which is not limited herein.

As shown in FIG. 2, the first differential mode capacitor module 13 includes a first differential mode capacitor CX1. The first differential mode capacitor CX1 is connected between the first differential mode suppression module 12 and the second differential mode suppression module 14. As shown in FIG. 2, the first terminal of the first differential mode capacitor CX1 is electrically connected to the second terminal of the first differential mode choke L1, the second terminal of the first resistor R1, the first terminal of the second differential mode choke L2, and the first terminal of the second resistor R2, respectively. The second terminal of the first differential mode capacitor CX1 is electrically connected to the second terminal of the third differential mode choke L3, the second terminal of the third resistor R3, the first terminal of the fourth differential mode choke L4, and the first terminal of the fourth resistor R4, respectively. Specifically, the first differential mode capacitor CX1 is used to suppress differential mode interference signals.

It should be noted that the first differential mode capacitor module 13 can also be replaced by other modules that can achieve its function, which is not limited herein.

As shown in FIG. 2, the second differential mode capacitor module 16 includes a second differential mode capacitor CX2. The second differential mode capacitor CX2 is connected between the second common mode suppression module 15 and the rectifier module 17. As shown in FIG. 2, the first terminal of the second differential mode capacitor CX2 is electrically connected to the first output terminal of the second common mode choke LF2 and the rectifier module 17, respectively. The second terminal of the second differential mode capacitor CX2 is electrically connected to the second output terminal of the second common mode choke LF2 and the rectifier module 17, respectively.

Specifically, the second differential mode capacitor CX2 is used to suppress differential mode interference signals. The materials of the first differential mode capacitor CX1, the second differential mode capacitor CX2 and the capacitors in the π-shaped filter module 18 are polypropylene films. It should be pointed out that the present application does not limit the number of differential mode capacitor modules, which can be one or more, as long as the sum of the capacitance capacity of the differential mode capacitor modules is less than or equal to 0.104 uF.

It should be noted that the second differential mode capacitor module 16 can also be replaced by other modules that can achieve its function, which is not limited herein.

As shown in FIG. 2, the rectifier module 17 includes a rectifier bridge BD1. The rectifier bridge BD1 is composed of four diodes, the first terminal of the rectifier bridge BD1 is electrically connected to the digital ground, the second terminal of the rectifier bridge BD1 is electrically connected to the second common mode suppression module 15 and the second differential mode capacitor module 16, respectively, the third terminal of the rectifier bridge BD1 is electrically connected to the second common mode suppression module 15 and the second differential mode capacitor module 16, respectively. The fourth terminal of the bridge BD1 is electrically connected with the π-shaped filter module 18. As shown in FIG. 2, the second terminal of the rectifier bridge BD1 is electrically connected to the first terminal of the second differential mode capacitor CX2 and the first output terminal of the second common mode choke LF2, respectively. The third terminal of the rectifier bridge BD1 is electrically connected to the second terminal of the second differential mode capacitor CX2 and the second output terminal of the second common mode choke LF2, respectively. Specifically, the rectifier bridge BD1 is used to rectify the AC voltage signal to the DC voltage signal.

It should be noted that the rectifier module 17 can also be replaced by other modules that can achieve its function, which is not limited herein.

As shown in FIG. 2, the π-shaped filter module 18 includes a fifth differential mode choke L5, a fifth resistor R5, a first capacitor C1 and a second capacitor C2. The first terminal of the fifth differential mode choke L5 is electrically connected with the first terminal of the fifth resistor R5, the first terminal of the first capacitor C1, and the rectifier module 17, respectively, and the second terminal of the fifth differential mode choke L5 is electrically connected with the second terminal of the fifth resistor R5, the first terminal of the second capacitor C2, and the booster circuit 30, respectively. The second terminal of the first capacitor C1 and the second terminal of the second capacitor C2 are electrically connected to the digital ground. As shown in FIG. 2, the first terminal of the fifth differential mode choke L5 is electrically connected with the first terminal of the fifth resistor R5, the first terminal of the first capacitor C1 and the fourth terminal of the rectifier bridge BD1, respectively. Specifically, the fifth resistor R5 is the discharge resistor to avoid excessive peak voltage of the fifth differential mode choke L5.

Specifically, the sum of the capacitance capacity of the first capacitor C1 and the second capacitor C2 is 2 to 3 times that of the first differential mode capacitor CX1 and the second differential mode capacitor CX2, and the sum of the capacitance capacity of the first differential mode capacitor CX1 and the second differential mode capacitor CX2 is less than or equal to 0.104 uF. The first capacitor C1, the second capacitor C2, the first differential mode capacitor CX1 and the second differential mode capacitor CX2 are made of polypropylene film, when the parameters meet the above conditions, the thyristor dimming system can not only achieve good dimming effect, but also ensure that the conduction does not exceed the standard.

Figure 3:
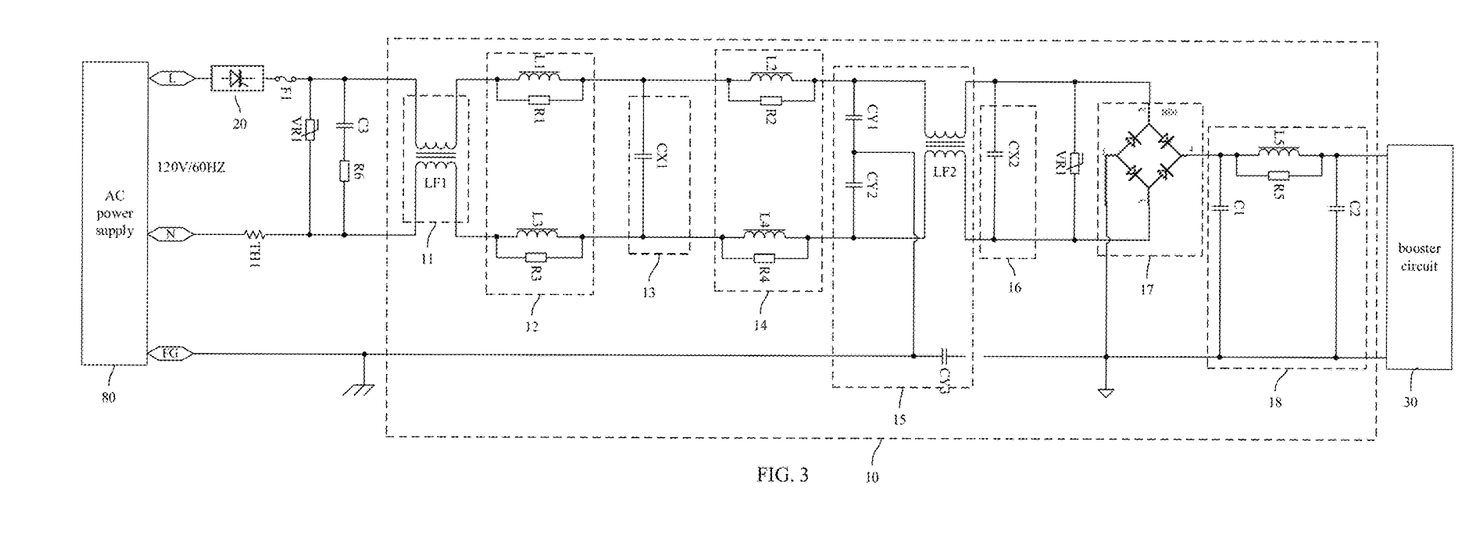
FIG. 3 is a circuit connection diagram of a filter circuit provided by another embodiment of the present application.

Illustratively, as shown in FIG. 3, the filter circuit 10 further includes a fuse F1, a first thermistor VR1, a third capacitor C3, a sixth resistor R6, a second thermistor VR2, and a surge suppression resistor TH1. The first terminal of the fuse F1 is electrically connected with the live wire L of the AC power supply 80 through the thyristor dimmer 20. The second terminal of the fuse F1 is electrically connected with the first terminal of the first thermistor VR1, the first terminal of the third capacitor C3, and the first input terminal of the first common mode choke LF1, respectively. The second terminal of the third capacitor C3 is electrically connected with the first terminal of the sixth resistor R6. The second terminal of the first thermistor VR1 is electrically connected with the second terminal of the sixth resistor R6, the first terminal of the surge suppression resistor TH1, and the second input terminal of the first common mode choke LF1, respectively, and the second terminal of the surge suppression resistor TH1 is electrically connected with the neutral line N of the AC power supply 80. The first terminal of the second thermistor VR2 is electrically connected to the first terminal of the second differential mode capacitor CX2, the first output terminal of the second common mode choke LF2, and the second terminal of the rectifier bridge BD1, respectively. The second terminal of the second thermistor VR2 is electrically connected to the second terminal of the second differential mode capacitor CX2, the second output terminal of the second common mode choke LF2, and the third terminal of the rectifier bridge BD1, respectively.

Specifically, when the current provided by the AC power supply 80 is too large, the fuse F1 is blown, which can avoid the subsequent circuit being subjected to large current impact. The first thermistor VR1 and the second thermistor VR2 are used to limit the voltage to ultra-high levels. The surge suppression resistor TH1 is used to suppress the surge current. The third capacitor C3 and the sixth resistor R6 constitute a dummy load circuit, which is used to provide a stable current to the thyristor dimmer 20.

Figure 4:
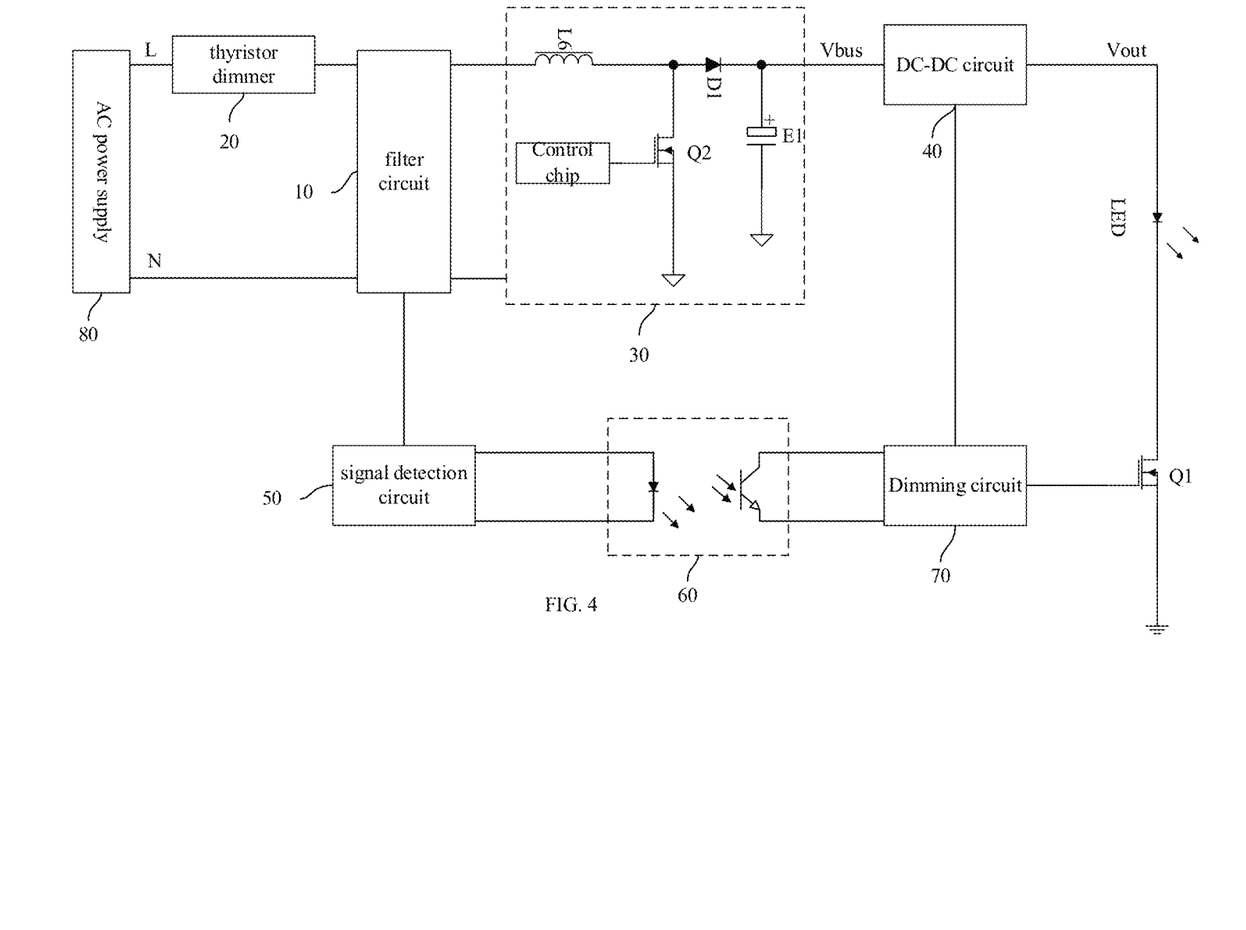
FIG. 4 is a schematic diagram of a circuit structure of a dimming system provided by an embodiment of the present application.

The embodiment of the present application further provides a dimming system, as shown in FIG. 4, the dimming system includes a thyristor dimmer 20, a booster circuit 30, a DC-DC circuit 40, a signal detection circuit 50, a photocoupler 60, a dimming circuit 70, a first switching tube Q1, and a filter circuit 10. The first common mode suppression module in the filter circuit 10 is electrically connected to the live line L of the AC power supply 80 through the thyristor dimmer 20. The first common mode suppression module in the filter circuit 10 is further used to be electrically connected to the neutral line N of the AC power supply 80. The π-shaped filter module in the filter circuit 10 is electrically connected to the booster circuit 30. Two terminals of the second differential mode capacitor module in the filter circuit 10 are electrically connected with the signal detection circuit 50, the DC-DC circuit 40 is electrically connected with the booster circuit 30, the dimming circuit 70, and the positive electrode of the light-emitting device, respectively, the signal detection circuit 50 is electrically connected with the input terminal of the photocoupler 60, and the output terminal of the photocoupler 60 is electrically connected with the dimming circuit 70. The dimming circuit 70 is electrically connected with the control terminal of the first switching tube Q1, the first conduction terminal of the first switching tube Q1 is electrically connected with the negative electrode of the light-emitting device, and the second conduction terminal of the first switching tube Q1 is electrically connected with the analog ground.

Specifically, after the AC voltage signal provided by the AC power supply 80 is chopped through the thyristor dimmer 20, the electrical signal is output to the filter circuit 10, and the filter circuit 10 is used to filter the electrical signal output by the thyristor dimmer 20, and to provide a stable and clean DC voltage signal to the boost circuit 30. The boost circuit 30 is used to boost the DC voltage signal to obtain a Vbus voltage. The DC-DC circuit 40 is used for step-down conversion of the Vbus voltage to obtain a Vout voltage, and the Vout voltage is used to power the light-emitting device. The signal detection circuit 50 is used to sample the voltage signal, and convert the sampled voltage signal into a PWM signal, and transmit the PWM signal to the photocoupler 60. The dimming circuit 70 is used to integrate and amplify the PWM signal output by the photocoupler 60, and output the final PWM signal to the first switching tube Q1. The first switch tube Q1 is used to periodically switch on according to the PWM signal to make the light-emitting device emitting light. The dimming circuit 70 is also used for on/off controlling the DC-DC circuit 40 to keep the Vout voltage stable.

By matching the parameters inside the filter circuit 10, when the sum of the capacitance capacity of the first differential mode capacitor module and the second differential mode capacitor module in the filter circuit 10 is less than or equal to the preset value, and the sum of the capacitance capacity of the π-shaped filter module in the filter circuit 10 is greater than the sum of the capacitance capacity of the first differential mode capacitor module and the second differential mode capacitor module, the dimming system can achieve good dimming effect and pass the conduction test in FCC part 15 standard.

Illustratively, as shown in FIG. 4, the booster circuit 30 includes a sixth choke L6, a first diode D1, a second switching tube Q2, a filter capacitor E1, and a control chip. The first terminal of the sixth choke L6 is electrically connected with the π-shaped filter module in the filter circuit 10, the second terminal of the sixth choke L6 is electrically connected with the first conduction terminal of the second switching tube Q2 and the positive electrode of the first diode D1, respectively, the control terminal of the second switching tube Q2 is electrically connected with the control chip, the second conduction terminal of the second switching tube Q2 is electrically connected with the digital ground, and the second conduction terminal of the second switching tube Q2 is electrically connected with the digital ground. The negative electrode of the first diode D1 is electrically connected with the positive electrode of the filter capacitor E1 and the DC-DC circuit 40, respectively, and the negative electrode of the filter capacitor E1 is electrically connected with the digital ground. Specifically, the sixth choke L6 is the boost choke. The control chip controls the second switching tube Q2 to turn on or off to achieve the boost function. The filter capacitor E1 is used for filtering to keep the Vbus voltage stable. The first diode D1 is used to prevent the filter capacitor E1 from discharging to the ground.

Illustratively, the first switching tube Q1 is an NMOS (N-Metal-Oxide-Semiconductor) tube, the control terminal of the first switching tube Q1 is a gate of the NMOS tube, and the first conduction terminal of the first switching tube Q1 is a drain of the NMOS tube. The second conduction terminal of the first switching tube Q1 is a source of the NMOS tube.

Illustratively, the DC-DC circuit 40 is a DC-DC isolation circuit.

Illustratively, the light-emitting device is an LED (light-emitting diode) light.

Figure 5:
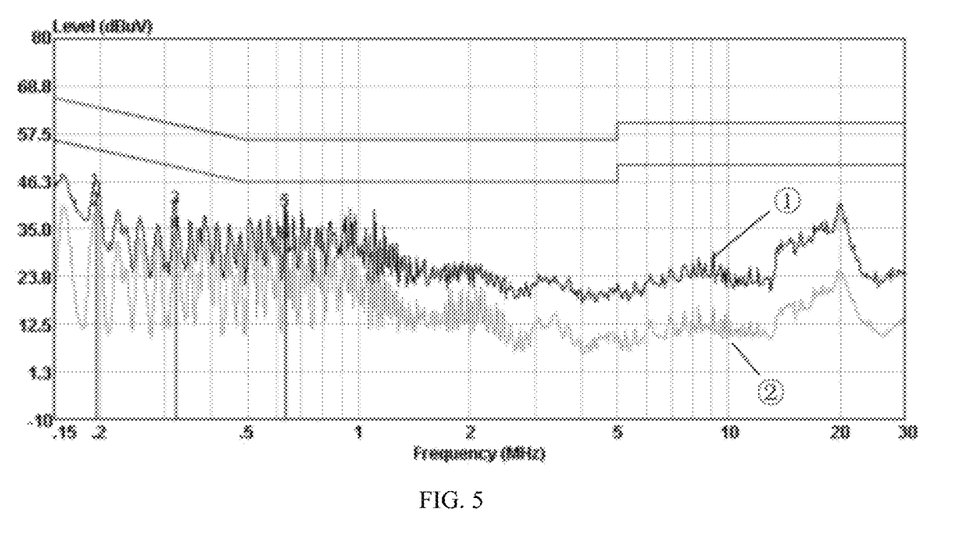
FIG. 5 is a schematic diagram of conduction test results of a dimming system in the present application.

The conduction test on the dimming system provided in the embodiment of the present application is conducted, and the test frequency is 150 kHZ-30 MHZ, and the test results are shown in FIG. 5. As shown in FIG. 5, the curve (1) is the test result curve of a quasi-peak value, and the curve (2) is the test result of the average value. It can be seen from the curve that neither the quasi-peak value nor the average value exceeds the limitation. That is, the conduction test is passed in the test frequency range.

The present application embodiment further provides an electronic apparatus including the dimming system described above. Since the electronic apparatus includes the dimming system described above, the electronic apparatus provided in the embodiment of the present application can both achieve good dimming effects and pass the conduction test in FCC part 15 standard. The working principle of the electronic apparatus refers to the above description of the working principle of the dimming system, which will not be repeated herein.

In the above embodiments, the description of each embodiment has its own emphasis, and the parts that are not detailed or documented in an embodiment can be referred to the relevant descriptions of other embodiments.

As stated above, the aforesaid embodiments are only intended to explain but not to limit the technical solutions of the present application. Although the present application has been explained in detail with reference to the above-described embodiments, it should be understood for those skilled in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A filter circuit, comprising:
a first common mode suppression module, a first differential mode suppression module, a first differential mode capacitor module, a second differential mode suppression module, a second common mode suppression module, a second differential mode capacitor module, a rectifier module, and a π-shaped filter module;
wherein the first differential mode suppression module is electrically connected with the first common mode suppression module and the second differential mode suppression module, respectively, the second common mode suppression module is electrically connected with the second differential mode suppression module and the rectifier module, respectively, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module, the first common mode suppression module is configured for electrically connecting with an alternating current power supply through a thyristor dimmer, and the π-shaped filter module is configured for electrically connecting with a booster circuit;

wherein the first common mode suppression module and the second common mode suppression module are configured for suppressing a common mode interference signal in an alternating current voltage signal provided by the alternating current power supply; the first differential mode suppression module, the second differential mode suppression module, the first differential mode capacitor module, and the second differential mode capacitor module are configured for suppressing a differential mode interference signal in the alternating current voltage signal; the rectifier module is configured for rectifying the alternating current voltage signal into a direct current voltage signal; the π-shaped filter module is configured for filtering the direct current voltage signal and transmitting a filtered direct current voltage signal to the booster circuit; and wherein a sum of a capacitance capacity of the first differential mode capacitor module and the second differential mode capacitor module is less than or equal to a preset value, and a sum of a capacitance capacity of the π-shaped filter module is greater than the sum of the capacitance capacity of the first differential mode capacitor module and the second differential mode capacitor module.

2. The filter circuit according to claim 1, wherein the sum of the capacitance capacity of the π-shaped filter module is 2 to 3 times of the sum of the capacitance capacity of the first differential mode capacitor module and the second differential mode capacitor module.

3. The filter circuit according to claim 1, wherein the first common mode suppression module comprises a first common mode choke;
- a first input terminal of the first common mode choke is configured for electrically connecting with a live line of the alternating current power supply through the thyristor dimmer; and
- a second input terminal of the first common mode choke is configured for electrically connecting with a neutral line of the alternating current power supply;
- wherein the first output terminal and the second output terminal of the first common mode choke are electrically connected with the first differential mode suppression module.

4. The filter circuit according to claim 2, wherein the first common mode suppression module comprises a first common mode choke;
- a first input terminal of the first common mode choke is configured for electrically connecting with a live line of the alternating current power supply through the thyristor dimmer; and
- a second input terminal of the first common mode choke is configured for electrically connecting with a neutral line of the alternating current power supply;
- wherein the first output terminal and the second output terminal of the first common mode choke are electrically connected with the first differential mode suppression module.

5. The filter circuit according to claim 1, wherein the first differential mode suppression module comprises a first differential mode choke, a first resistor, a third differential mode choke, and a third resistor;
- a first terminal of the first differential mode choke is electrically connected with a first terminal of the first resistor and the first common mode suppression module, respectively;
- a second terminal of the first differential mode choke is electrically connected with a second terminal of the first resistor, the first differential mode capacitor module, and the second differential mode suppression module, respectively;
- a first terminal of the third differential mode choke is electrically connected with a first terminal of the third resistor and the first common mode suppression module, respectively; and
- a second terminal of the third differential mode choke is electrically connected with a second terminal of the third resistor, the first differential mode capacitor module, and the second differential mode suppression module, respectively;
- wherein an inductance amount of the first differential mode choke is equal to that of the third differential mode choke.

6. The filter circuit according to claim 2, wherein the first differential mode suppression module comprises a first differential mode choke, a first resistor, a third differential mode choke, and a third resistor;
- a first terminal of the first differential mode choke is electrically connected with a first terminal of the first resistor and the first common mode suppression module, respectively;
- a second terminal of the first differential mode choke is electrically connected with a second terminal of the first resistor, the first differential mode capacitor module, and the second differential mode suppression module, respectively;
- a first terminal of the third differential mode choke is electrically connected with a first terminal of the third resistor and the first common mode suppression module, respectively; and
- a second terminal of the third differential mode choke is electrically connected with a second terminal of the third resistor, the first differential mode capacitor module, and the second differential mode suppression module, respectively;
- wherein an inductance amount of the first differential mode choke is equal to that of the third differential mode choke.

7. The filter circuit according to claim 1, wherein the second differential mode suppression module comprises a second differential mode choke, a fourth differential mode choke, a second resistor, and a fourth resistor;
- a first terminal of the second differential mode choke is electrically connected with a first terminal of the second resistor, the first differential mode capacitor module, and the first differential mode suppression module, respectively;
- a second terminal of the second differential mode choke is electrically connected with a second terminal of the second resistor and the second common mode suppression module, respectively;

a first terminal of the fourth differential mode choke is electrically connected with a first terminal of the fourth resistor, the first differential mode capacitor module, and the first differential mode suppression module, respectively; and a second terminal of the fourth differential mode choke is electrically connected with a second terminal of the fourth resistor and the second common mode suppression module respectively;

wherein an inductance amount of the second differential mode choke is equal to that of the fourth differential mode choke.

8. The filter circuit according to claim 2, wherein the second differential mode suppression module comprises a second differential mode choke, a fourth differential mode choke, a second resistor, and a fourth resistor;

a first terminal of the second differential mode choke is electrically connected with a first terminal of the second resistor, the first differential mode capacitor module, and the first differential mode suppression module, respectively;

a second terminal of the second differential mode choke is electrically connected with a second terminal of the second resistor and the second common mode suppression module, respectively;

a first terminal of the fourth differential mode choke is electrically connected with a first terminal of the fourth resistor, the first differential mode capacitor module, and the first differential mode suppression module, respectively; and a second terminal of the fourth differential mode choke is electrically connected with a second terminal of the fourth resistor and the second common mode suppression module respectively;

wherein an inductance amount of the second differential mode choke is equal to that of the fourth differential mode choke.

9. The filter circuit according to claim 1, wherein the second common mode suppression module comprises a first common mode capacitor, a second common mode capacitor, a third common mode capacitor, and a second common mode choke;

a first terminal of the first common mode capacitor is electrically connected with a first input terminal of the second common mode choke and the second differential mode suppression module, respectively;

a second terminal of the first common mode capacitor is electrically connected with a first terminal of the second common mode capacitor, a first terminal of the third common mode capacitor, and a ground line of the alternating current power supply, respectively, and the ground line of the alternating current power supply is connected to a ground;

a second terminal of the second common mode capacitor is electrically connected with a second input terminal of the second common mode choke and the second differential mode suppression module, respectively;

a first output terminal of the second common mode choke is electrically connected with the second differential mode capacitor module and the rectifier module, respectively;

a second output terminal of the second common mode choke is electrically connected with the second differential mode capacitor module and the rectifier module, respectively; and a second terminal of the third common mode capacitor is electrically connected with a digital ground.

10. The filter circuit according to claim 2, wherein the second common mode suppression module comprises a first common mode capacitor, a second common mode capacitor, a third common mode capacitor, and a second common mode choke;

a first terminal of the first common mode capacitor is electrically connected with a first input terminal of the second common mode choke and the second differential mode suppression module, respectively;

a second terminal of the first common mode capacitor is electrically connected with a first terminal of the second common mode capacitor, a first terminal of the third common mode capacitor, and a ground line of the alternating current power supply, respectively, and the ground line of the alternating current power supply is connected to a ground;

a second terminal of the second common mode capacitor is electrically connected with a second input terminal of the second common mode choke and the second differential mode suppression module, respectively;

a first output terminal of the second common mode choke is electrically connected with the second differential mode capacitor module and the rectifier module, respectively;

a second output terminal of the second common mode choke is electrically connected with the second differential mode capacitor module and the rectifier module, respectively; and a second terminal of the third common mode capacitor is electrically connected with a digital ground.

11. The filter circuit according to claim 1, wherein the first differential mode capacitor module comprises a first differential mode capacitor connected between the first differential mode suppression module and the second differential mode suppression module.

12. The filter circuit according to claim 2, wherein the first differential mode capacitor module comprises a first differential mode capacitor connected between the first differential mode suppression module and the second differential mode suppression module.

13. The filter circuit according to claim 11, wherein the second differential mode capacitor module comprises a second differential mode capacitor connected between the second common mode suppression module and the rectifier module, and capacitors in the first differential mode capacitor, the second differential mode capacitor, and the π-shaped filter module are made of polypropylene film.

14. A dimming system, comprising: a thyristor dimmer, a booster circuit, a DC-DC circuit, a signal detection circuit, a photocoupler, a dimming circuit, a first switching tube and a filter circuit; wherein the filter circuit comprises:

a first common mode suppression module, a first differential mode suppression module, a first differential mode capacitor module, a second differential mode suppression module, a second common mode suppression module, a second differential mode capacitor module, a rectifier module, and a π-shaped filter module;

wherein the first differential mode suppression module is electrically connected with the first common mode suppression module and the second differential mode suppression module, respectively, the second common mode suppression module is electrically connected with the second differential mode suppression module and the rectifier module, respectively, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module, the first common mode suppression module is configured for electrically connecting with an alternating current power supply through a thyristor dimmer, and the π-shaped filter module is configured for electrically connecting with a booster circuit;

wherein the first common mode suppression module and the second common mode suppression module are configured for suppressing a common mode interference signal in an alternating current voltage signal provided by the alternating current power supply; the first differential mode suppression module, the second differential mode suppression module, the first differential mode capacitor module, and the second differential mode capacitor module are configured for suppressing a differential mode interference signal in the alternating current voltage signal; the rectifier module is configured for rectifying the alternating current voltage signal into a direct current voltage signal; the π-shaped filter module is configured for filtering the direct current voltage signal and transmitting a filtered direct current voltage signal to the booster circuit;

wherein a sum of a capacitance capacity of the first differential mode capacitor module and the second differential mode capacitor module is less than or equal to a preset value, and a sum of a capacitance capacity of the π-shaped filter module is greater than the sum of the capacitance capacity of the first differential mode capacitor module and the second differential mode capacitor module;

wherein the first common mode suppression module in the filter circuit is electrically connected with a live line of an alternating current power supply through a thyristor regulator;

the first common mode suppression module in the filter circuit is further configured for electrically connecting with a neutral line of the alternating current power supply;

the π-shaped filter module in the filter circuit is electrically connected with a boost circuit;

two terminals of the second differential mode capacitor module in the filter circuit are electrically connected with a signal detection circuit;

the DC-DC circuit is respectively electrically connected with the boost circuit, the dimming circuit and a positive electrode of a light-emitting device;

the signal detection circuit is electrically connected with an input terminal of the photocoupler, and an output terminal of the photocoupler is electrically connected with the dimming circuit;

the dimming circuit is electrically connected with a control terminal of the first switching tube; and a first conduction terminal of the first switching tube is electrically connected with a negative electrode of the light-emitting device, and a second conduction terminal of the first switching tube is electrically connected with an analog ground.

15. The dimming system according to claim 14, wherein the sum of the capacitance capacity of the π-shaped filter module is 2 to 3 times of the sum of the capacitance capacity of the first differential mode capacitor module and the second differential mode capacitor module.

16. The dimming system according to claim 14, wherein the first common mode suppression module comprises a first common mode choke;
a first input terminal of the first common mode choke is configured for electrically connecting with a live line of the alternating current power supply through the thyristor dimmer; and
a second input terminal of the first common mode choke is configured for electrically connecting with a neutral line of the alternating current power supply;
wherein the first output terminal and the second output terminal of the first common mode choke are electrically connected with the first differential mode suppression module.

17. The dimming system according to claim 14, wherein the first differential mode suppression module comprises a first differential mode choke, a first resistor, a third differential mode choke, and a third resistor;
a first terminal of the first differential mode choke is electrically connected with a first terminal of the first resistor and the first common mode suppression module, respectively;
a second terminal of the first differential mode choke is electrically connected with a second terminal of the first resistor, the first differential mode capacitor module, and the second differential mode suppression module, respectively;
a first terminal of the third differential mode choke is electrically connected with a first terminal of the third resistor and the first common mode suppression module, respectively; and
a second terminal of the third differential mode choke is electrically connected with a second terminal of the third resistor, the first differential mode capacitor module, and the second differential mode suppression module, respectively;
wherein an inductance amount of the first differential mode choke is equal to that of the third differential mode choke.

18. The dimming system according to claim 14, wherein the second differential mode suppression module comprises a second differential mode choke, a fourth differential mode choke, a second resistor, and a fourth resistor;
a first terminal of the second differential mode choke is electrically connected with a first terminal of the second resistor, the first differential mode capacitor module, and the first differential mode suppression module, respectively;
a second terminal of the second differential mode choke is electrically connected with a second terminal of the second resistor and the second common mode suppression module, respectively;
a first terminal of the fourth differential mode choke is electrically connected with a first terminal of the fourth resistor, the first differential mode capacitor module, and the first differential mode suppression module, respectively; and
a second terminal of the fourth differential mode choke is electrically connected with a second terminal of the fourth resistor and the second common mode suppression module respectively;
wherein an inductance amount of the second differential mode choke is equal to that of the fourth differential mode choke.

19. The dimming system according to claim 14, wherein the second common mode suppression module comprises a first common mode capacitor, a second common mode capacitor, a third common mode capacitor, and a second common mode choke;
- a first terminal of the first common mode capacitor is electrically connected with a first input terminal of the second common mode choke and the second differential mode suppression module, respectively;
- a second terminal of the first common mode capacitor is electrically connected with a first terminal of the second common mode capacitor, a first terminal of the third common mode capacitor, and a ground line of the alternating current power supply, respectively, and the ground line of the alternating current power supply is connected to a ground;
- a second terminal of the second common mode capacitor is electrically connected with a second input terminal of the second common mode choke and the second differential mode suppression module, respectively;
- a first output terminal of the second common mode choke is electrically connected with the second differential mode capacitor module and the rectifier module, respectively;
- a second output terminal of the second common mode choke is electrically connected with the second differential mode capacitor module and the rectifier module, respectively; and
- a second terminal of the third common mode capacitor is electrically connected with a digital ground.

20. An electronic apparatus, comprising a dimming system, wherein the dimming system comprises: a thyristor dimmer, a booster circuit, a DC-DC circuit, a signal detection circuit, a photocoupler, a dimming circuit, a first switching tube and a filter circuit; wherein the filter circuit comprises:
- a first common mode suppression module, a first differential mode suppression module, a first differential mode capacitor module, a second differential mode suppression module, a second common mode suppression module, a second differential mode capacitor module, a rectifier module, and a π-shaped filter module;
- wherein the first differential mode suppression module is electrically connected with the first common mode suppression module and the second differential mode suppression module, respectively, the second common mode suppression module is electrically connected with the second differential mode suppression module and the rectifier module, respectively, and the rectifier module is electrically connected with the π-shaped filter module; the first differential mode capacitor module is connected between the first differential mode suppression module and the second differential mode suppression module, the second differential mode capacitor module is connected between the second common mode suppression module and the rectifier module, the first common mode suppression module is configured for electrically connecting with an alternating current power supply through a thyristor dimmer, and the π-shaped filter module is configured for electrically connecting with a booster circuit;
- wherein the first common mode suppression module and the second common mode suppression module are configured for suppressing a common mode interference signal in an alternating current voltage signal provided by the alternating current power supply; the first differential mode suppression module, the second differential mode suppression module, the first differential mode capacitor module, and the second differential mode capacitor module are configured for suppressing a differential mode interference signal in the alternating current voltage signal; the rectifier module is configured for rectifying the alternating current voltage signal into a direct current voltage signal; the π-shaped filter module is configured for filtering the direct current voltage signal and transmitting a filtered direct current voltage signal to the booster circuit;
- wherein a sum of a capacitance capacity of the first differential mode capacitor module and the second differential mode capacitor module is less than or equal to a preset value, and a sum of a capacitance capacity of the π-shaped filter module is greater than the sum of the capacitance capacity of the first differential mode capacitor module and the second differential mode capacitor module;
- wherein the first common mode suppression module in the filter circuit is electrically connected with a live line of an alternating current power supply through a thyristor regulator;
- the first common mode suppression module in the filter circuit is further configured for electrically connecting with a neutral line of the alternating current power supply;
- the π-shaped filter module in the filter circuit is electrically connected with a boost circuit;
- two terminals of the second differential mode capacitor module in the filter circuit are electrically connected with a signal detection circuit;
- the DC-DC circuit is respectively electrically connected with the boost circuit, the dimming circuit and a positive electrode of a light-emitting device;
- the signal detection circuit is electrically connected with an input terminal of the photocoupler, and an output terminal of the photocoupler is electrically connected with the dimming circuit;
- the dimming circuit is electrically connected with a control terminal of the first switching tube; and
- a first conduction terminal of the first switching tube is electrically connected with a negative electrode of the light-emitting device, and a second conduction terminal of the first switching tube is electrically connected with an analog ground.

* * * * *